(12) United States Patent
Li

(10) Patent No.: US 11,721,037 B2
(45) Date of Patent: Aug. 8, 2023

(54) INDOOR POSITIONING METHOD AND APPARATUS, ELECTRONIC DEVICE AND STORAGE MEDIUM

(71) Applicant: Beijing Baidu Netcom Science and Technology Co., Ltd., Beijing (CN)

(72) Inventor: Zhaohu Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 387 days.

(21) Appl. No.: 17/202,192

(22) Filed: Mar. 15, 2021

(65) Prior Publication Data
US 2021/0390732 A1    Dec. 16, 2021

(30) Foreign Application Priority Data
Jun. 10, 2020    (CN) .......................... 202010522041.2

(51) Int. Cl.
*G06T 19/00*    (2011.01)
*G06T 7/73*    (2017.01)

(52) U.S. Cl.
CPC .............. *G06T 7/73* (2017.01); *G06T 19/003* (2013.01); *G06T 2207/30244* (2013.01)

(58) Field of Classification Search
CPC ..... G06F 16/7847; G06T 19/003; G06T 7/74; G06T 7/50; G06T 7/73; G06K 9/6215; H04N 5/445; H04N 5/23258
(Continued)

(56) References Cited

U.S. PATENT DOCUMENTS

2021/0104064 A1*    4/2021  Shin .................... G06F 18/2413
2021/0312657 A1*    10/2021 Monir ...................... G06N 5/01

FOREIGN PATENT DOCUMENTS

CN        106197427 A        12/2016
CN        107392964 A        11/2017
(Continued)

OTHER PUBLICATIONS

Notice of Allowance for CN202010522041.2, dated May 23, 2023, 5 pgs.
(Continued)

*Primary Examiner* — Phuoc H Doan
(74) *Attorney, Agent, or Firm* — Kwan & Olynick LLP

(57) ABSTRACT

The present application relates to a method for indoor positioning, and an apparatus, an electronic device and a storage medium, which relates to the fields of positioning technologies and deep learning technologies. A specific implementation solution is: extracting descriptors of structure lines in a specified image collected by a terminal indoors; based on the descriptors of the structure lines in the specified image and descriptors of structure lines of images included in a pre-established indoor image database, acquiring, from the indoor image database, target structure line descriptors closest to the descriptors of the structure lines in the specified image; and acquiring pose information of the terminal based on a pre-established indoor 3D structure line map and the target structure line descriptors corresponding to the descriptors of the structure lines in the specified image. The present application can position a terminal based on structure lines in a specified image collected by the terminal indoors, without being affected by texture information such as a billboard in the image, as well as illumination and appearance changes, which has higher robustness
(Continued)

and can effectively improve the stability and accuracy of indoor positioning.

20 Claims, 6 Drawing Sheets

(58) Field of Classification Search
USPC .......................................................... 382/154
See application file for complete search history.

(56) References Cited

FOREIGN PATENT DOCUMENTS

| CN | 108645398 A | 10/2018 |
|---|---|---|
| CN | 111194015 A | 5/2020 |
| WO | 2018053756 A1 | 3/2018 |

OTHER PUBLICATIONS

Pavel Davidson, et al., A Survey of Selected Indoor Positioning Methods for Smartphones, DOI 10.1109/COMST.2016.2637663, IEEE, Dec. 31, 2016 (45 pgs.).

Siyuan Xie, et al.. Key Technologies and Applications of Accurate Indoor Positioning, Dec. 31, 2015, 11 pgs.

* cited by examiner

INDOOR POSITIONING METHOD AND APPARATUS, ELECTRONIC DEVICE AND STORAGE MEDIUM

The present application claims the priority of Chinese Patent Application No. 202010522041.2, filed on Jun. 10, 2020, with the title of "Indoor positioning method and apparatus, electronic device and storage medium". The disclosure of the above application is incorporated herein by reference in its entirety.

FIELD OF THE DISCLOSURE

The present application relates to the field of computer technologies and deep learning technologies, particularly to the field of positioning technologies, and specifically to a method for indoor positioning, and an apparatus, an electronic device and a storage medium.

BACKGROUND OF THE DISCLOSURE

In indoor navigation and positioning, a current general technical solution is to first use an image retrieval technology to perform image retrieval to obtain a sub-map matching images taken by a camera. Feature points are then matched in the retrieved sub-map, and final position information of the camera is obtained by using an optimization method. For example, when the feature points are matched, an offline point cloud map may be first established through a structure from motion (SFM) or Simultaneous Localization and Mapping (SLAM) technology, with each three-dimensional (3D) point carrying coordinate information and red-green-blue (RGB) feature information. During positioning, a rough local map is obtained through the image retrieval technology, and then two-dimensional (2D) to 3D feature point matching is performed on the sub-map. Finally, Perspective-n-Point (PnP for short) is used to calculate pose information of the camera to complete positioning.

However, due to complex indoor environments, such as illumination and dynamic objects, the above technical solution cannot work well. Especially in a scene like a shopping mall, positioning in the shopping mall based on the above features relies to a large extent on richly textured images such as billboards. However, the images such as billboards are not static and at a high updating frequency, leading to the poor stability of indoor positioning in the prior art.

SUMMARY OF THE DISCLOSURE

In order to solve the above technical problems, the present application provides a method for indoor positioning, and an apparatus, an electronic device and a storage medium.

According to one aspect of the present application, a method for indoor positioning is provided, including:

extracting descriptors of structure lines in a specified image collected by a terminal indoors;

based on the descriptors of the structure lines in the specified image and descriptors of structure lines of images included in a pre-established indoor image database, acquiring, from the indoor image database, target structure line descriptors closest to the descriptors of the structure lines in the specified image; and acquiring pose information of the terminal based on a pre-established indoor 3D structure line map and the target structure line descriptors corresponding to the descriptors of the structure lines in the specified image.

According to another aspect of the present application, there is provided an electronic device, comprising:

at least one processor; and a memory communicatively connected with the at least one processor;

wherein the memory stores instructions executable by the at least one processor, and the instructions are executed by the at least one processor to enable the at least one processor to perform a method for indoor positioning, wherein the method comprises:

extracting descriptors of structure lines in a specified image collected by a terminal indoors;

based on the descriptors of the structure lines in the specified image and descriptors of structure lines of images included in a pre-established indoor image database, acquiring, from the indoor image database, target structure line descriptors closest to the descriptors of the structure lines in the specified image; and acquiring pose information of the terminal based on a pre-established indoor 3D structure line map and the target structure line descriptors corresponding to the descriptors of the structure lines in the specified image.

According to a further aspect of the present application, there is provided non-transitory computer readable storage medium with computer instructions stored thereon, wherein the computer instructions are used for causing a computer to perform a method for indoor positioning, wherein the method comprises:

extracting descriptors of structure lines in a specified image collected by a terminal indoors;

based on the descriptors of the structure lines in the specified image and descriptors of structure lines of images comprised in a pre-established indoor image database, acquiring, from the indoor image database, target structure line descriptors closest to the descriptors of the structure lines in the specified image; and acquiring pose information of the terminal based on a pre-established indoor 3D structure line map and the target structure line descriptors corresponding to the descriptors of the structure lines in the specified image.

According to the technology in the present application, a terminal can be positioned based on structure lines in a specified image collected by the terminal indoors, without being affected by texture information such as a billboard in the image, as well as illumination and appearance changes, which has higher robustness and can effectively improve the stability and accuracy of indoor positioning.

It shall be understood that the content described in this part is neither intended to identify key or important features of embodiments of the present disclosure and nor intended to limit the scope of the present disclosure. Other effects of the above alternatives will be described below with reference to specific embodiments.

BRIEF DESCRIPTION OF DRAWINGS

The accompanying drawings are intended to better understand the solution and do not constitute limitations on the present application. In the drawings.

DETAILED DESCRIPTION OF PREFERRED EMBODIMENTS

Exemplary embodiments of the present application are described below with reference to the accompanying drawings, including various details of the embodiments of the present application to facilitate understanding, and should be considered as exemplary only. Therefore, those of ordinary skill in the art should be aware that various changes and modifications can be made to the embodiments described herein without departing from the scope and spirit of the present application. Similarly, for clarity and simplicity, descriptions of well-known functions and structures are omitted in the following description.

Figure 1:
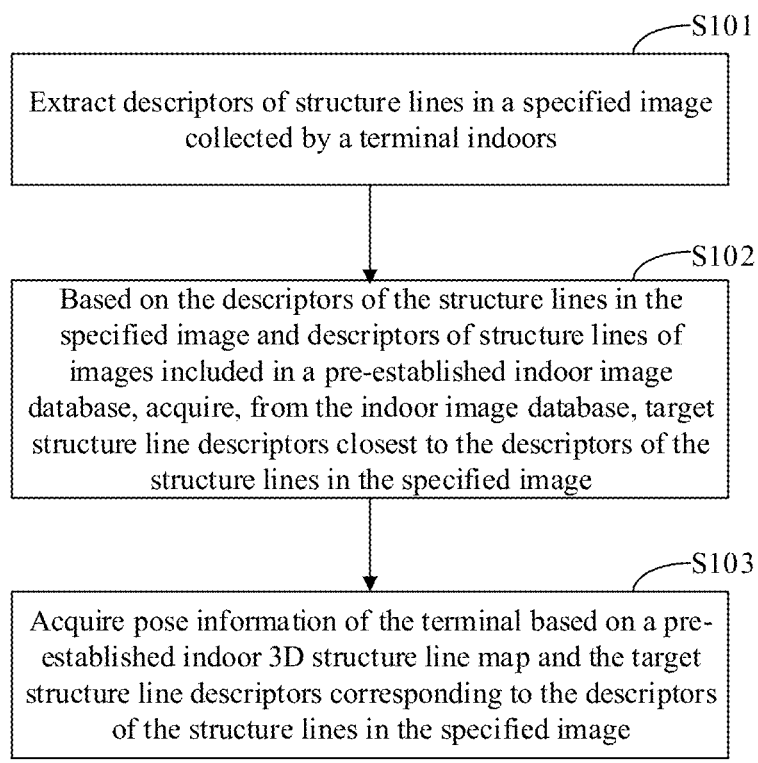
FIG. 1 is a schematic diagram of a first embodiment according to the present application.

FIG. 1 is a schematic diagram of a first embodiment according to the present application. As shown in FIG. 1, the present embodiment provides a method for indoor positioning, which may specifically include following steps:

S101: Descriptors of structure lines in a specified image collected by a terminal indoors are extracted.

S102: Based on the descriptors of the structure lines in the specified image and descriptors of structure lines of images included in a pre-established indoor image database, target structure line descriptors closest to the descriptors of the structure lines in the specified image are acquired from the indoor image database.

S103: Pose information of the terminal is acquired based on a pre-established indoor 3D structure line map and the target structure line descriptors corresponding to the descriptors of the structure lines in the specified image.

The indoor positioning method in the present embodiment is performed by an apparatus for indoor positioning. The indoor positioning apparatus may be a physical electronic device or a software-integrated application. In use, the application is run on a computer device such as a mobile phone or a computer, and a terminal can be positioned based on a specified image collected by the terminal indoors.

The terminal in the present embodiment may be an electronic device with a shooting function such as a mobile phone or a camera. For example, when a user enters a large indoor scene, due to a complex indoor environment, the user can use a terminal to collect an image as a specified image if wanting to determine a current position. Then the specified image collected may be sent to the indoor positioning apparatus in the present embodiment, and the indoor positioning apparatus implements indoor positioning of the terminal based on the specified image.

The indoor positioning apparatus in the present embodiment first extracts descriptors of structure lines in a specified image collected by a terminal indoors. The structure lines in the present embodiment are lines in an indoor building structure, such as lines of doors, windows, stairs and edges of walls in an indoor building that are collected in a specified image and other architectural hardware in the indoor building. Such lines are generally lines of a hardware structure of the indoor buildings, for example, wireframes, and thus are referred to as structure lines. When the hardware structure of the indoor building does not change, the structure lines of the indoor building may not change. Compared with soft billboards and decorations in the indoor building, the structure lines in the indoor building are relatively fixed. Without transformation of the building structure, the structure lines may not change as decorative colors and materials change.

The descriptors of the structure lines in the present embodiment, as unique features of the structure lines, are used to uniquely identify the corresponding structure lines. For example, relationships between the structure lines and surrounding structure lines in the interior building may be taken as the descriptors of the structure lines to describe the structure lines. Alternatively, the structure lines may be described with reference to other reference objects, which are not exemplified herein.

In the present embodiment, since a shooting angle of the terminal is not limited, the specified image collected by the terminal indoors may include one structure line, or two or more structure lines. The indoor positioning apparatus in the present embodiment needs to extract a descriptor of each structure line in the specified image. Then, the indoor positioning apparatus, based on the descriptors of the structure lines in the specified image and descriptors of structure lines of images included in a pre-established indoor image database, acquires, from the indoor image database, a target structure line descriptor closest to the descriptor of each structure line in the specified image. A target structure line corresponding to each target structure line descriptor is known, and pose information of each target structure line in the indoor 3D structure line map is determined. Therefore, based on a pre-established indoor 3D structure line map and the target structure line descriptors acquired, pose information of the terminal shooting the specified image in the 3D space may be calculated according to the pose information of the corresponding target structure lines in the specified image, so as to implement indoor positioning of the terminal. The pose information in the present embodiment may include position information and attitude information, namely rotation information. The pose information is 6-degree-of-freedom information.

The indoor positioning method in the present embodiment includes: extracting descriptors of structure lines in a specified image collected by a terminal indoors; based on the descriptors of the structure lines in the specified image and descriptors of structure lines of images included in a pre-established indoor image database, acquiring, from the indoor image database, target structure line descriptors closest to the descriptors of the structure lines in the specified image; and acquiring pose information of the terminal based on a pre-established indoor 3D structure line map and the target structure line descriptors corresponding to the descriptors of the structure lines in the specified image. Compared with the prior art, the present application can position a terminal based on structure lines in a specified image collected by the terminal indoors, without being affected by texture information such as a billboard in the image, as well as illumination and appearance changes, which has higher robustness and can effectively improve the stability and accuracy of indoor positioning.

Figure 2:
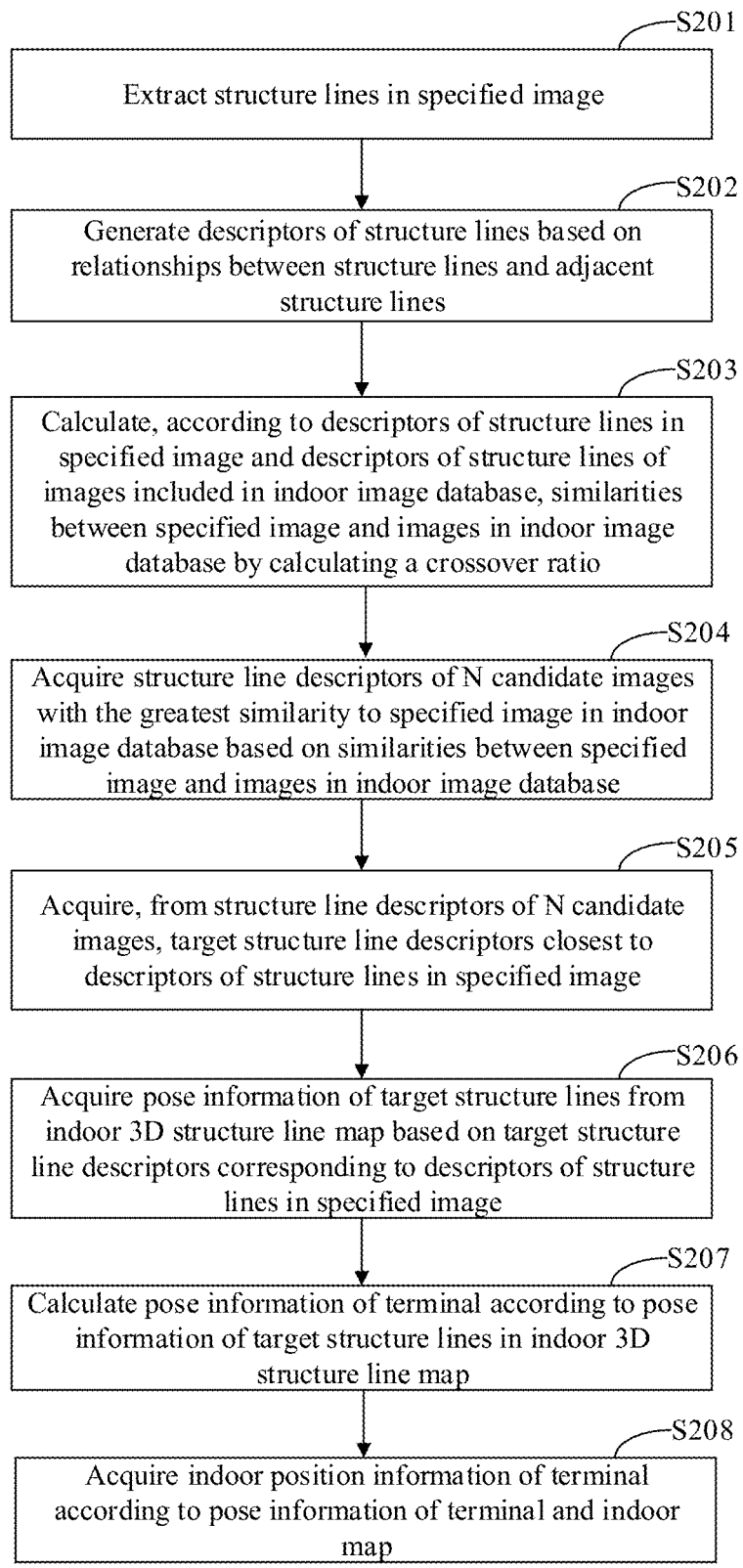
FIG. 2 is a schematic diagram of a second embodiment according to the present application.

FIG. 2 is a schematic diagram of a second embodiment according to the present application. As shown in FIG. 2, on the basis of the technical solution of the embodiment shown in FIG. 1, the technical solution of the present application is further introduced in more detail with reference to a method for indoor positioning in the present embodiment. As shown in FIG. 2, the indoor positioning method in the present embodiment may specifically include the following steps:

S201: The structure lines in the specified image are extracted.

For example, in the present embodiment, various 2D structural lines may be extracted from the specified image by using an open-source line extraction algorithm.

S202: The descriptors of the structure lines are generated based on relationships between the structure lines and adjacent structure lines.

In order to avoid the interference of texture in the specified image with a positioning result, in the present embodiment, for each structure line, the descriptor of the corresponding structure line may be generated based on a relationship between the structure line and adjacent structure lines. Specifically, intersecting lines in a 2D space are very likely to be next to each other in a 3D space. Therefore, the descriptors of the structure lines may be generated based on relationships between the structure lines and adjacent structure lines, that is, neighborhood information of the structure lines.

Figure 3A:
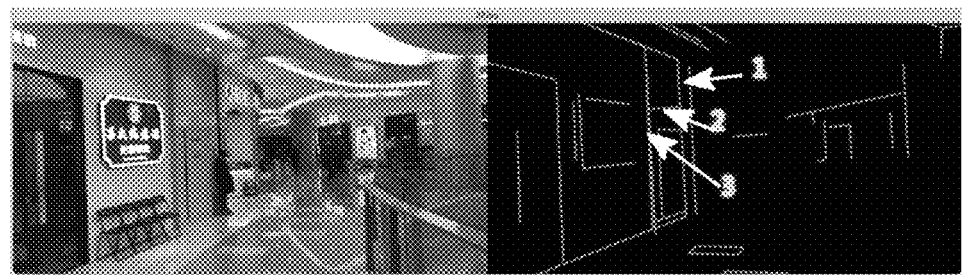
FIG. 3A and FIG. 3B are schematic diagrams of two images according to the present application.
Figure 3B:
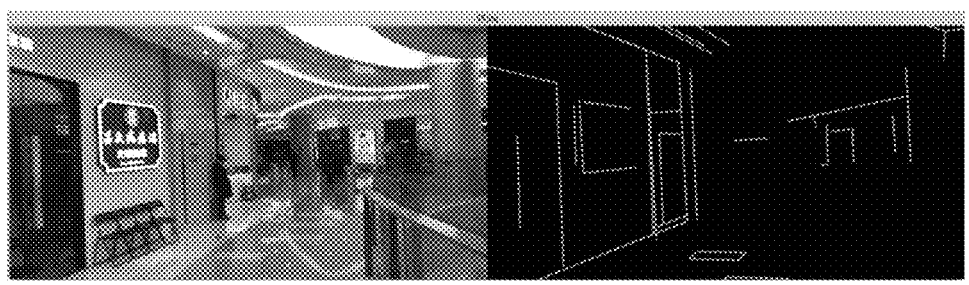

For example, FIG. 3A and FIG. 3B are schematic diagrams of two images according to the present application. As shown in FIG. 3A, structure lines 1, 2 and 3 are shown in the figure, and it may be found that the lines 1 and 2 intersect by 90 degrees, and the lines 2 and 3 intersect by 90 degrees. Then, if there is also a logical relationship between lines of 90 degrees→90 degrees in FIG. 3B, matching structure lines may be found to a large extent. Based on the idea, the present application proposes a method of acquiring information of neighborhood structure lines based on random walk and generating structure line descriptors.

For example, for the structure lines, during specific random walks, a current structure line may be taken as a starting point of a random walk to randomly walk to other adjacent structure lines, there is a total of m random walks, and a step size of each random walk is n steps, and an angle between a structure line after each step in each random walk and the structure line before walk in a 2D space is acquired; and based on the angle between the structure line after each step in each random walk and the structure line before walk in the 2D space, a descriptor of the corresponding structure line, which is an expression of m*n, is generated. That is, the value of the descriptor of the structure line corresponding to each step in each random walk is an angle between the structure line after walk and the structure line before walk in the 2D space. And m and n may be set according to an actual requirement.

Figure 4:
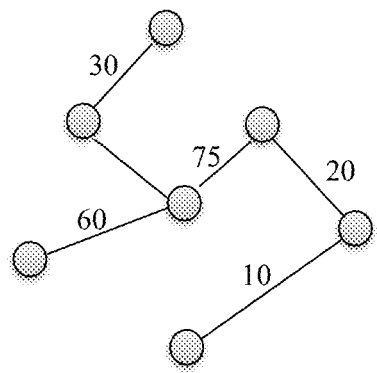
FIG. 4 is a relational graph formed by all intersecting structure lines in an image extracted according to the present application.
Figure 5:
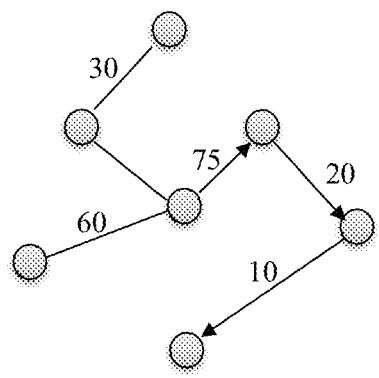
FIG. 5 is a random walk route in the relational graph shown in FIG. 4.

For example, FIG. 4 is a relational graph formed by all intersecting structure lines in an image extracted according to the present application. Each node may be identified with an id of a structure line, and an edge may be an angle between two adjacent structure lines. The random walk may be performed based on the relational graph of the specified image shown in FIG. 4. For each structure line, the number of random walks is set to m and a step size of each random walk is set to n, and then a descriptor m*n of the structure line, namely a matrix of m rows and n columns, can be obtained. For example, FIG. 5 is a random walk route in the relational graph shown in FIG. 4. As shown in FIG. 5, according to the random walk route shown by arrows, the route constructs a 1*3 vector of (75, 20, 10). Through m random walks and the step size n of each random walk, all neighborhood information around a current structure line can be learned, so as to describe the structure line, that is, a descriptor of the structure line is generated, which may be represented by a matrix of m rows and n columns.

The descriptor of the structure line constructed in the above manner, as key information in the image, is a very robust descriptor, free from the interference of external texture, illumination and appearance changes. Moreover, information of neighborhood structure lines is also added to the descriptor of the structure line, which makes the matching more robust and more accurate during positioning. Besides, the descriptors of the structure lines in the present embodiment not only effectively reflect information of each structure line, but also fuse constraint information between different structure lines into the descriptors, which plays a non-negligible role in a long-term positioning service.

Steps S201 to S202 are a specific implementation of step S101 in the embodiment shown in FIG. 1.

S203: Similarities between the specified image and the images in the indoor image database by calculating a crossover ratio are calculated according to the descriptors of the structure lines in the specified image and the descriptors of the structure lines of the images included in the indoor image database.

S204: Structure line descriptors of N candidate images with the greatest similarity to the specified image in the indoor image database are acquired based on the similarities between the specified image and the images in the indoor image database.

S205: The target structure line descriptors closest to the descriptors of the structure lines in the specified image are acquired from the structure line descriptors of the N candidate images.

A descriptor of each structure line in the specified image can be obtained by following the steps above. In addition, in the present embodiment, an indoor image database also needs to be pre-collected, and the indoor image database may include a plurality of images of various positions and angles inside the building. Moreover, the descriptors of the structure lines in each image are extracted and stored in advance according to the manner of describing the structure lines in the image.

An image retrieval technology is employed in the retrieve process of step S203 to S205. First, N candidate images with the greatest similarity to the specified image are acquired from the indoor image database based on the descriptors of the structure lines. Then, specific to the level of structure lines, the target structure line descriptors closest to the descriptors of the structure lines in the specified image are acquired from the structure line descriptors of the N candidate images.

In the process of acquiring N candidate images with the greatest similarity to the specified image from the indoor image database, similarities between the specified image and the images in the indoor image database by calculating a crossover ratio. For example, the specified image includes k1 structure lines, a descriptor of each structure line being m*n, and an image of the indoor image database includes k2 structure lines, a descriptor of each structure line being m*n; the descriptors of the structure lines in two images are compared one by one to acquire the number w of descriptors of matching structure lines; then a crossover ratio of the two images may be expressed as w/(k1+k2), to serve as a similarity between the two images. In the above manner, the similarity between the specified image and each image in the indoor image database can be obtained. Then N candidate images with the greatest similarity are selected as subgraphs obtained by preliminary retrieval. Second-level more refined retrieval is then performed in the subgraphs. Similarly, in the second-level retrieval, target structure lines closest to the structure lines in the specified image are found in structure lines of the N candidate images still based on the descriptors of the structure lines. Specifically, the descriptor m*n of each structure line in the specified image is compared with the descriptor m*n of each structure line in the N candidate images to acquire the number of same rows. Then, a structure line corresponding to a structure line descriptor with the maximum number of same rows is acquired from all structure line descriptors of the N candidate images as a target structure line closest to a current structure line in the specified image, and a descriptor of the target structure line can be acquired. In the above manner, a target structure line descriptor corresponding to each structure line in the specified image may be acquired from the structure line descriptors of the N candidate images.

Steps S203 to S205 are a specific implementation of step S102 in the embodiment shown in FIG. 1. With the manner, the target structure line closest to each structure line in the specified image can be accurately acquired based on the granularity of the structure line, and the accuracy of the acquired target structure line can be effectively guaranteed.

S206: Pose information of the target structure lines is acquired from the indoor 3D structure line map based on the target structure line descriptors corresponding to the descriptors of the structure lines in the specified image.

S207: The pose information of the terminal is calculated according to the pose information of the target structure lines in the indoor 3D structure line map.

After the target structure lines closest to the structure lines in the specified image are acquired, the structure lines in the specified image may be replaced with the corresponding target structure lines, to implement indoor positioning of the terminal. In addition, the target structure line descriptors are known information in the indoor image database, and the descriptor and the pose information of each structure line are identified in the indoor 3D structure line map. Therefore, pose information of target structure lines may be acquired from the indoor 3D structure line map to implement 2D-to-3D matching. Then, pose information of the terminal shooting the specified image may be calculated based on the pose information of the target structure lines, to implement indoor positioning of the terminal. With the manner, the accuracy of indoor positioning can be effectively guaranteed. For example, ransac+pnl may be employed in the present embodiment to achieve relatively accurate indoor positioning results.

Steps S206 to S207 are a specific implementation of step S103 in the embodiment shown in FIG. 1.

S208: Indoor position information of the terminal is acquired according to the pose information of the terminal and an indoor map.

In the present embodiment, the indoor map is different from the indoor 3D structure line map. The indoor 3D structure line map is a 3D map based on structure lines. A descriptor of each structure line and pose information of each structure line are mainly identified in the indoor 3D structure line map, and a position relationship between two adjacent structure lines is further clearly identified in the indoor 3D structure line map. The indoor map refers to indoor position information of a building, for example, it can represent position information of indoor Points Of Interest (POI), and so on. In the indoor map, a current position of the terminal may be deduced according to the pose information of the terminal acquired, so as to inform the user of the current position in the indoor map. When the user needs to go to a POI, the user may also be provided with navigation.

It is to be noted that before step S203 in the above embodiment, the method may further include: establishing an indoor image database and establishing an indoor 3D structure line map.

For example, the establishing an indoor image database may specifically include following steps:

(1) Images at various positions on the indoor map are collected.

For example, images from a plurality of angles at various positions may also be included.

(2) Descriptors of structure lines in the images are extracted.

Descriptors of all structure lines included in each image are extracted, which may be obtained with reference to the specific implementation in steps S201 and S202 and is not repeated herein.

(3) The images, the descriptors of the structure lines in the images and their corresponding relationships are stored.

Each image and descriptors of structure lines in each image may be accurately recorded in the indoor image database constructed in this manner, so as to facilitate subsequent accurate indoor positioning of the terminal based on the constructed indoor image database.

Further, after step (3), the method may further include following steps to establish the indoor 3D structure line map:

(4) Each pair of two adjacent structure lines in the images is triangulated to construct pose information of the structure lines in the 3D space.

(5) The indoor 3D structure line map is constructed based on the pose information of the structure lines in the images in the 3D space.

The triangulating each pair of two adjacent structure lines in the images to construct pose information of the structure lines in the 3D space is mainly used to implement accurate 2D-to-3D mapping. All the structure lines are mapped to the indoor 3D structure line map, and pose information of each structure line in the 3D space can be obtained, so as to construct the indoor 3D structure line map. With the construction manner, accurate 2D-to-3D mapping can also be ensured, and the accuracy of the constructed indoor 3D structure line map can be effectively ensured.

The technical solution of the present embodiment is applicable to fields such as Augmented Reality (AR) and Virtual Reality (VR) technologies, and can implement indoor positioning of a terminal device using AR or VR based on any specified image collected by a user, which is very convenient to use.

According to the indoor positioning method in the present embodiment, with the above technical solution, not only can descriptors of structure lines in a specified image be extracted accurately, but also N candidate images with the greatest similarity to the specified image can be accurately acquired based on descriptors of structure lines in the specified image and descriptors of structure lines of images included in an indoor image database and structure lines of target structure line descriptors closest to the descriptors of the structure lines in the specified image are further accurately acquired from structure line descriptors of the N candidate images. Finally, the terminal is accurately positioned in an indoor 3D structure line map based on the target structure line descriptors. The whole indoor positioning process does not rely on any illumination, color, texture interference, has very strong robustness, and can effectively improve the stability and accuracy of indoor positioning.

Figure 6:
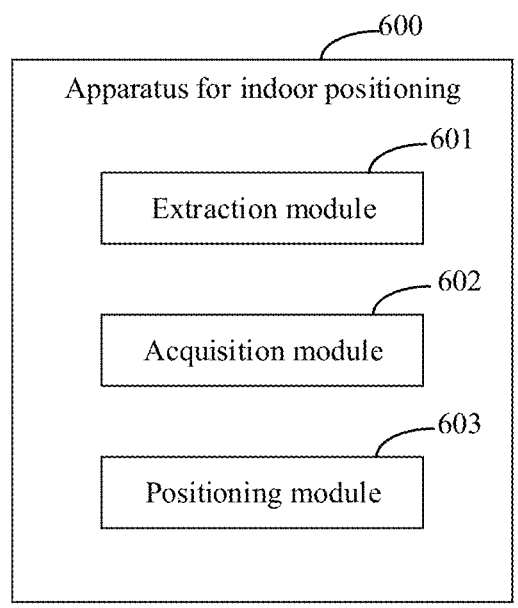
FIG. 6 is a schematic diagram of a third embodiment according to the present application.

FIG. 6 is a schematic diagram of a third embodiment according to the present application. As shown in FIG. 6, an apparatus 600 for indoor positioning in the present embodiment includes:

an extraction module 601 configured to extract descriptors of structure lines in a specified image collected by a terminal indoors;

an acquisition module 602 configured to, based on the descriptors of the structure lines in the specified image and descriptors of structure lines of images included in a pre-established indoor image database, acquire, from the indoor image database, target structure line descriptors closest to the descriptors of the structure lines in the specified image; and a positioning module 603 configured to acquire pose information of the terminal based on a pre-established indoor 3D structure line map and the target structure line descriptors corresponding to the descriptors of the structure lines in the specified image.

The indoor positioning apparatus 600 in the present embodiment implements the implementation principle and technical effect of indoor positioning through the above modules, which is the same as the implementation of the above related method embodiments. Details can be obtained with reference to the description of the related method embodiments and are not repeated herein.

Figure 7:
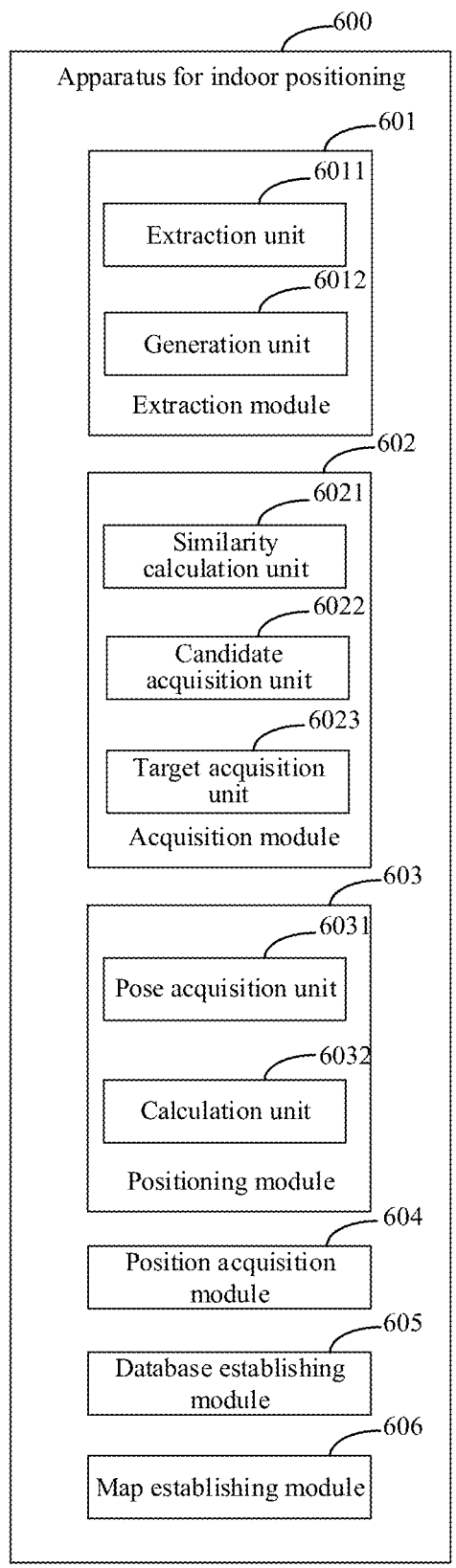
FIG. 7 is a schematic diagram of a fourth embodiment according to the present application.

FIG. 7 is a schematic diagram of a fourth embodiment according to the present application. As shown in FIG. 7, on the basis of the technical solution of the embodiment shown in FIG. 6, the technical solution of the present application is further introduced in more detail with reference to the indoor positioning apparatus 600 in the present embodiment.

As shown in FIG. 7, in the indoor positioning apparatus 600 in the present embodiment, the extraction module 601 includes:

an extraction unit 6011 configured to extract the structure lines in the specified image; and a generation unit 6012 configured to generate the descriptors of the structure lines based on relationships between the structure lines and adjacent structure lines.

Further optionally, the generation unit 6012 is configured to:

for the structure lines, take a current structure line as a starting point of a random walk to randomly walk to other adjacent structure lines, there being a total of m random walks, and a step size of each random walk being n steps, and acquire an angle between a structure line after each step in each random walk and the structure line before walk in a 2D space; and generate, based on the angle between the structure line after each step in each random walk and the structure line before walk in the 2D space, a descriptor of the corresponding structure line, the descriptor of the structure line being an expression of m*n.

Further optionally, as shown in FIG. 7, in the indoor positioning apparatus 600 in the present embodiment, the acquisition module 602 includes:

a similarity calculation unit 6021 configured to calculate, according to the descriptors of the structure lines in the specified image and the descriptors of the structure lines of the images included in the indoor image database, similarities between the specified image and the images in the indoor image database by calculating a crossover ratio;

a candidate acquisition unit 6022 configured to acquire structure line descriptors of N candidate images with the greatest similarity to the specified image in the indoor image database based on the similarities between the specified image and the images in the indoor image database; and a target acquisition unit 6023 configured to acquire, from the structure line descriptors of the N candidate images, the target structure line descriptors closest to the descriptors of the structure lines in the specified image.

Further optionally, as shown in FIG. 7, in the indoor positioning apparatus 600 in the present embodiment, the positioning module 603 includes:

a pose acquisition unit 6031 configured to acquire pose information of the target structure lines from the indoor 3D structure line map based on the target structure line descriptors corresponding to the descriptors of the structure lines in the specified image; and a calculation unit 6032 configured to calculate the pose information of the terminal according to the pose information of the target structure lines in the indoor 3D structure line map.

Further optionally, as shown in FIG. 7, the indoor positioning apparatus 600 in the present embodiment further includes:

a position acquisition module 604 configured to acquire indoor position information of the terminal according to the pose information of the terminal and an indoor map.

Further optionally, as shown in FIG. 7, the indoor positioning apparatus 600 in the present embodiment further includes:

a database establishing module 605 configured to establish an indoor image database.

Further, the database establishing module 605 is configured to:

collect images at various positions on the indoor map;

extract descriptors of structure lines in the images; and store the images, the descriptors of the structure lines in the images and their corresponding relationships.

Further optionally, as shown in FIG. 7, the indoor positioning apparatus 600 in the present embodiment further includes:

a map establishing module 606 configured to establish an indoor 3D structure line map.

Further, the map establishing module 606 is configured to:

triangulate each pair of two adjacent structure lines in the images to construct pose information of the structure lines in the 3D space; and construct the indoor 3D structure line map based on the pose information of the structure lines in the images in the 3D space.

The indoor positioning apparatus 600 in the present embodiment implements the implementation principle and technical effect of indoor positioning through the above modules, which is the same as the implementation of the above related method embodiments. Details can be obtained with reference to the description of the related method embodiments and are not repeated herein.

According to embodiments of the present application, the present application further provides an electronic device and a readable storage medium.

Figure 8:
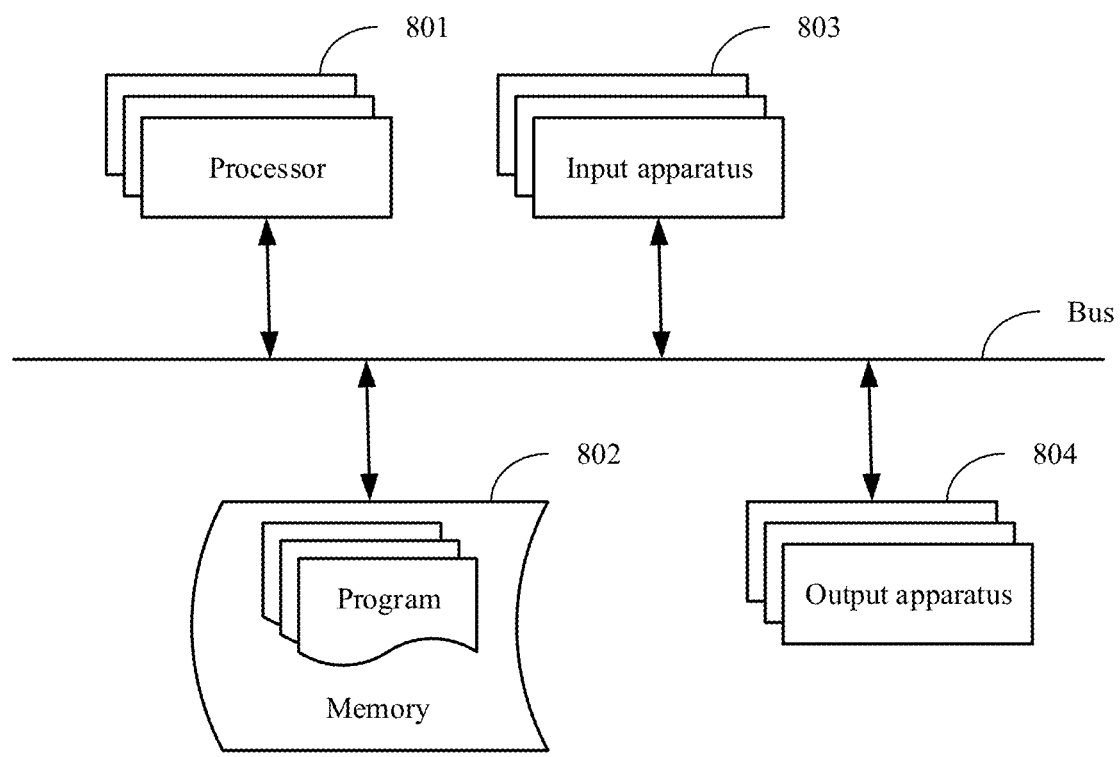
FIG. 8 is a block diagram of an electronic device configured to implement a method for indoor positioning according to an embodiment of the present application.

As shown in FIG. 8, it is a block diagram of an electronic device configured to implement a method for indoor positioning according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present application as described and/or required herein.

As shown in FIG. 8, the electronic device includes: one or more processors 801, a memory 802, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface (GUI) on an external input/output apparatus (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 801 is taken as an example is FIG. 8.

The memory 802 is the non-instantaneous computer-readable storage medium according to the present application. The memory stores instructions executable by at least one processor to make the at least one processor perform the indoor positioning method according to the present application. The non-instantaneous computer-readable storage medium according to the present application stores computer instructions. The computer instructions are used to make a computer perform the indoor positioning method according to the present application.

The memory 802, as a non-instantaneous computer-readable storage medium, may be configured to store non-instantaneous software programs, non-instantaneous computer executable programs and modules, for example, program instructions/modules corresponding to the indoor positioning method in the embodiment of the present application (e.g., the related modules shown in FIG. 6 and FIG. 7). The processor 801 runs the non-instantaneous software programs, instructions and modules stored in the memory 802 to execute various functional applications and data processing of a server, that is, to implement the indoor positioning method in the above method embodiment.

The memory 802 may include a program storage area and a data storage area. The program storage area may store an operating system and an application required by at least one function; and the data storage area may store data created according to use of the electronic device that implements the indoor positioning method. In addition, the memory 802 may include a high-speed random access memory, and may further include a non-instantaneous memory, for example, at least one disk storage device, a flash memory device, or other non-instantaneous solid-state storage devices. In some embodiments, the memory 802 optionally includes memories remotely disposed relative to the processor 801. The remote memories may be connected, over a network, to the electronic device that implements the indoor positioning method. Examples of the network include, but are not limited to, the Internet, intranets, local area networks, mobile communication networks and combinations thereof.

The electronic device that implements the indoor positioning method may further include: an input apparatus 803 and an output apparatus 804. The processor 801, the memory 802, the input apparatus 803 and the output apparatus 804 may be connected through a bus or in other manners. In FIG. 8, the connection through a bus is taken as an example.

The input apparatus 803 may receive input numerical information or character information, and generate key signal input related to user setting and function control of the electronic device that implements the indoor positioning method, for example, input apparatuses such as a touch screen, a keypad, a mouse, a trackpad, a touch pad, a pointer, one or more mouse buttons, a trackball, and a joystick. The output apparatus 804 may include a display device, an auxiliary lighting apparatus (e.g., an LED) and a tactile feedback apparatus (e.g., a vibration motor). The display device may include, but is not limited to, a liquid crystal display (LCD), a light-emitting diode (LED) display, and a plasma display. In some implementations, the display device may be a touch screen.

Various implementations of the systems and technologies described herein may be implemented in a digital electronic circuit system, an integrated circuit system, an application-specific integrated circuit (ASIC), computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device (PLD)) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display apparatus (e.g., a cathode-ray tube (CRT) or an LCD monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and VPS services.

The technical solution according to the embodiment of the present application is: extracting descriptors of structure lines in a specified image collected by a terminal indoors; based on the descriptors of the structure lines in the specified image and descriptors of structure lines of images included in a pre-established indoor image database, acquiring, from the indoor image database, target structure line descriptors closest to the descriptors of the structure lines in the specified image; and acquiring pose information of the terminal based on a pre-established indoor 3D structure line map and the target structure line descriptors corresponding to the descriptors of the structure lines in the specified image. Compared with the prior art, the present application can position a terminal based on structure lines in a specified image collected by the terminal indoors, without being affected by texture information such as a billboard in the image, as well as illumination and appearance changes, which has higher robustness and can effectively improve the stability and accuracy of indoor positioning.

According to the technical solutions in the embodiments of the present embodiment, not only can descriptors of structure lines in a specified image be extracted accurately, but also N candidate images with the greatest similarity to the specified image can be accurately acquired based on descriptors of structure lines in the specified image and descriptors of structure lines of images included in an indoor image database and structure lines of target structure line descriptors closest to the descriptors of the structure lines in the specified image are further accurately acquired from structure line descriptors of the N candidate images. Finally, the terminal is accurately positioned in an indoor 3D structure line map based on the target structure line descriptors. The whole indoor positioning process does not rely on any illumination, color, texture interference, has very strong robustness, and can effectively improve the stability and accuracy of indoor positioning.

It shall be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors. Any modifications, equivalent substitutions and improvements made within the spirit and principle of the present application all should be included in the extent of protection of the present application.

What is claimed is:

1. A method for indoor positioning, comprising:
   extracting descriptors of structure lines in a specified image collected by a terminal indoors;
   based on the descriptors of the structure lines in the specified image and descriptors of structure lines of images comprised in a pre-established indoor image database, acquiring, from the indoor image database, target structure line descriptors closest to the descriptors of the structure lines in the specified image; and
   acquiring pose information of the terminal based on a pre-established indoor three-dimensional (3D) structure line map and the target structure line descriptors corresponding to the descriptors of the structure lines in the specified image.

2. The method according to claim 1, wherein the extracting descriptors of structure lines in a specified image collected by a terminal indoors comprises:
   extracting the structure lines in the specified image; and
   generating the descriptors of the structure lines based on relationships between the structure lines and adjacent structure lines.

3. The method according to claim 2, wherein the generating the descriptors of the structure lines based on relationships between the structure lines and adjacent structure lines comprises:
   for the structure lines, taking a current structure line as a starting point of a random walk to randomly walk to other adjacent structure lines, there being a total of m random walks, and a step size of each random walk being n steps, and acquiring an angle between a structure line after each step in each random walk and the structure line before walk in a two-dimensional (2D) space; and
   generating, based on the angle between the structure line after each step in each random walk and the structure line before walk in the 2D space, a descriptor of the corresponding structure line, the descriptor of the structure line being an expression of m*n.

4. The method according to claim 3, wherein after the acquiring pose information of the terminal based on a pre-established indoor 3D structure line map and the target structure line descriptors corresponding to the descriptors of the structure lines in the specified image, the method further comprises:
   acquiring indoor position information of the terminal according to the pose information of the terminal and an indoor map.

5. The method according to claim 2, wherein after the acquiring pose information of the terminal based on a pre-established indoor 3D structure line map and the target structure line descriptors corresponding to the descriptors of the structure lines in the specified image, the method further comprises:
   acquiring indoor position information of the terminal according to the pose information of the terminal and an indoor map.

6. The method according to claim 2, wherein before the based on the descriptors of the structure lines in the specified image and descriptors of structure lines of images comprised in a pre-established indoor image database, acquiring, from the indoor image database, target structure line descriptors closest to the descriptors of the structure lines in the specified image, the method further comprises:

collecting images at various positions on the indoor map;
extracting descriptors of structure lines in the images; and
storing the images, the descriptors of the structure lines in the images and their corresponding relationships to establish the indoor image database.

7. The method according to claim 1, wherein the based on the descriptors of the structure lines in the specified image and descriptors of structure lines of images comprised in a pre-established indoor image database, acquiring, from the indoor image database, target structure line descriptors closest to the descriptors of the structure lines in the specified image comprises:
calculating, according to the descriptors of the structure lines in the specified image and the descriptors of the structure lines of the images comprised in the indoor image database, similarities between the specified image and the images in the indoor image database by calculating a crossover ratio;
acquiring structure line descriptors of N candidate images with the greatest similarity to the specified image in the indoor image database based on the similarities between the specified image and the images in the indoor image database; and
acquiring, from the structure line descriptors of the N candidate images, the target structure line descriptors closest to the descriptors of the structure lines in the specified image.

8. The method according to claim 1, wherein the acquiring pose information of the terminal based on a pre-established indoor 3D structure line map and the target structure line descriptors corresponding to the descriptors of the structure lines in the specified image comprises:
acquiring pose information of the target structure lines from the indoor 3D structure line map based on the target structure line descriptors corresponding to the descriptors of the structure lines in the specified image; and
calculating the pose information of the terminal according to the pose information of the target structure lines in the indoor 3D structure line map.

9. The method according to claim 1, wherein after the acquiring pose information of the terminal based on a pre-established indoor 3D structure line map and the target structure line descriptors corresponding to the descriptors of the structure lines in the specified image, the method further comprises:
acquiring indoor position information of the terminal according to the pose information of the terminal and an indoor map.

10. The method according to claim 1, wherein before the based on the descriptors of the structure lines in the specified image and descriptors of structure lines of images comprised in a pre-established indoor image database, acquiring, from the indoor image database, target structure line descriptors closest to the descriptors of the structure lines in the specified image, the method further comprises:
collecting images at various positions on the indoor map;
extracting descriptors of structure lines in the images; and
storing the images, the descriptors of the structure lines in the images and their corresponding relationships to establish the indoor image database.

11. The method according to claim 10, wherein after extracting descriptors of structure lines in the images and before the acquiring pose information of the terminal based on a pre-established indoor 3D structure line map and the target structure line descriptors corresponding to the descriptors of the structure lines in the specified image, the method further comprises:
triangulating each pair of two adjacent structure lines in the images to construct pose information of the structure lines in the 3D space; and
constructing the indoor 3D structure line map based on the pose information of the structure lines in the images in the 3D space.

12. An electronic device, comprising:
at least one processor; and
a memory communicatively connected with the at least one processor;
wherein the memory stores instructions executable by the at least one processor, and the instructions are executed by the at least one processor to enable the at least one processor to perform a method for indoor positioning, wherein the method comprises:
extracting descriptors of structure lines in a specified image collected by a terminal indoors;
based on the descriptors of the structure lines in the specified image and descriptors of structure lines of images comprised in a pre-established indoor image database, acquiring, from the indoor image database, target structure line descriptors closest to the descriptors of the structure lines in the specified image; and
acquiring pose information of the terminal based on a pre-established indoor three-dimensional (3D) structure line map and the target structure line descriptors corresponding to the descriptors of the structure lines in the specified image.

13. The electronic device according to claim 12, wherein the extracting descriptors of structure lines in a specified image collected by a terminal indoors comprises:
extracting the structure lines in the specified image; and
generating the descriptors of the structure lines based on relationships between the structure lines and adjacent structure lines.

14. The electronic device according to claim 13, wherein the generating the descriptors of the structure lines based on relationships between the structure lines and adjacent structure lines comprise:
for the structure lines, taking a current structure line as a starting point of a random walk to randomly walk to other adjacent structure lines, there being a total of m random walks, and a step size of each random walk being n steps, and acquiring an angle between a structure line after each step in each random walk and the structure line before walk in a two-dimensional (2D) space; and
generating, based on the angle between the structure line after each step in each random walk and the structure line before walk in the 2D space, a descriptor of the corresponding structure line, the descriptor of the structure line being an expression of m*n.

15. The electronic device according to claim 12, wherein the based on the descriptors of the structure lines in the specified image and descriptors of structure lines of images comprised in a pre-established indoor image database, acquiring, from the indoor image database, target structure line descriptors closest to the descriptors of the structure lines in the specified image comprises:
calculating, according to the descriptors of the structure lines in the specified image and the descriptors of the structure lines of the images comprised in the indoor image database, similarities between the specified image and the images in the indoor image database by calculating a crossover ratio;

acquiring structure line descriptors of N candidate images with the greatest similarity to the specified image in the indoor image database based on the similarities between the specified image and the images in the indoor image database; and acquiring, from the structure line descriptors of the N candidate images, the target structure line descriptors closest to the descriptors of the structure lines in the specified image.

16. The electronic device according to claim 12, wherein the acquiring pose information of the terminal based on a pre-established indoor 3D structure line map and the target structure line descriptors corresponding to the descriptors of the structure lines in the specified image comprises:

acquiring pose information of the target structure lines from the indoor 3D structure line map based on the target structure line descriptors corresponding to the descriptors of the structure lines in the specified image; and calculating the pose information of the terminal according to the pose information of the target structure lines in the indoor 3D structure line map.

17. The electronic device according to claim 12, wherein after the acquiring pose information of the terminal based on a pre-established indoor 3D structure line map and the target structure line descriptors corresponding to the descriptors of the structure lines in the specified image, the method further comprises:

acquiring indoor position information of the terminal according to the pose information of the terminal and an indoor map.

18. The electronic device according to claim 12, wherein before the based on the descriptors of the structure lines in the specified image and descriptors of structure lines of images comprised in a pre-established indoor image database, acquiring, from the indoor image database, target structure line descriptors closest to the descriptors of the structure lines in the specified image, the method further comprises:

collecting images at various positions on the indoor map;

extracting descriptors of structure lines in the images; and storing the images, the descriptors of the structure lines in the images and their corresponding relationships.

19. The electronic device according to claim 18, wherein after extracting descriptors of structure lines in the images and before the acquiring pose information of the terminal based on a pre-established indoor 3D structure line map and the target structure line descriptors corresponding to the descriptors of the structure lines in the specified image, the method further comprises:

triangulating each pair of two adjacent structure lines in the images to construct pose information of the structure lines in the 3D space; and constructing the indoor 3D structure line map based on the pose information of the structure lines in the images in the 3D space.

20. A non-transitory computer readable storage medium with computer instructions stored thereon, wherein the computer instructions are used for causing a computer to perform a method for indoor positioning, wherein the method comprises:

extracting descriptors of structure lines in a specified image collected by a terminal indoors;

based on the descriptors of the structure lines in the specified image and descriptors of structure lines of images comprised in a pre-established indoor image database, acquiring, from the indoor image database, target structure line descriptors closest to the descriptors of the structure lines in the specified image; and acquiring pose information of the terminal based on a pre-established indoor three-dimensional (3D) structure line map and the target structure line descriptors corresponding to the descriptors of the structure lines in the specified image.

* * * * *